(12) United States Patent
Stuler et al.

(10) Patent No.: US 8,711,582 B2
(45) Date of Patent: Apr. 29, 2014

(54) PARASITIC ELEMENT COMPENSATION CIRCUIT AND METHOD FOR COMPENSATING FOR THE PARASITIC ELEMENT

(75) Inventors: Roman Stuler, Karolinka (CZ); Karel Ptacek, Roznov Pod Radhostem (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 744 days.

(21) Appl. No.: 12/414,862

(22) Filed: Mar. 31, 2009

(65) Prior Publication Data
US 2010/0244941 A1    Sep. 30, 2010

(51) Int. Cl.
*H02M 3/335*    (2006.01)

(52) U.S. Cl.
USPC .................. 363/21.06; 363/21.14; 363/84

(58) Field of Classification Search
USPC ........... 363/21.06, 21.14, 81, 82, 84, 89, 127; 327/341, 538, 539, 543, 581
See application file for complete search history.

(56) References Cited

U.S. PATENT DOCUMENTS

| | | | | |
|---|---|---|---|---|
| 5,801,550 | A * | 9/1998 | Tanaka et al. ................. | 326/87 |
| 7,656,917 | B2 * | 2/2010 | Brunner et al. .............. | 372/38.08 |
| 2001/0036818 | A1 * | 11/2001 | Dobrovolny ................. | 455/326 |
| 2003/0174525 | A1 * | 9/2003 | Ingman et al. ................ | 363/90 |
| 2006/0006849 | A1 * | 1/2006 | Haslett et al. ................ | 323/247 |
| 2006/0006922 | A1 * | 1/2006 | Sander ......................... | 327/434 |
| 2006/0268585 | A1 * | 11/2006 | Domb et al. ................. | 363/21.06 |
| 2008/0094048 | A1 * | 4/2008 | Basso et al. .................. | 323/283 |
| 2008/0169895 | A1 * | 7/2008 | Lee .............................. | 336/185 |
| 2008/0285312 | A1 * | 11/2008 | Fu et al. ...................... | 363/21.06 |
| 2008/0304291 | A1 * | 12/2008 | Degen et al. ................ | 363/21.06 |
| 2009/0322405 | A1 * | 12/2009 | McDonald et al. .......... | 327/374 |
| 2009/0323375 | A1 * | 12/2009 | Galvano et al. ............. | 363/21.06 |

OTHER PUBLICATIONS

Semiconductor Components Industries, LLC, Feb. 2008—Rev. 2 ; NCP4302 Secondary Side Synchromous Flyback Controller Data Sheet; Publication Order No. NCP4302/D; http://onsemi.com.
International Rectifier; Data Sheet PD60254E IR1167ASPbF IR1167BSPbF SmartRectifier Control IC; www.irf.com, Date: Mar. 2008.

* cited by examiner

*Primary Examiner* — Adolf Berhane
*Assistant Examiner* — Gustavo Rosario Benitez
(74) *Attorney, Agent, or Firm* — Rennie William Dover

(57) ABSTRACT

A circuit and method for compensating for parasitic elements of a transistor. A transistor, a controller, and a compensation element are mounted to a printed circuit board. The transistor includes parasitic drain and source inductors. The compensation element may be a discrete inductor that has an inductance value equal to about the sum of the inductance values of the parasitic drain and source inductors. The magnitudes of the compensation voltage and the sum of the voltages across the parasitic drain and source inductances are substantially equal. Thus, the compensation voltage developed across the compensation inductor is used to adjust a reference voltage within the controller. A drain-to-source voltage is applied to one input of a comparator within the controller and the adjusted reference voltage is applied to another input of the comparator. An output signal of the comparator is input to drive circuitry that drives a gate of the transistor.

18 Claims, 2 Drawing Sheets

PARASITIC ELEMENT COMPENSATION CIRCUIT AND METHOD FOR COMPENSATING FOR THE PARASITIC ELEMENT

TECHNICAL FIELD

The present invention relates, in general, to switching mode power supplies and, more particularly, to synchronous rectification in switching mode power supplies.

BACKGROUND

Switching mode power supplies (SMPS) are used in a variety of applications including notebook adapters, liquid crystal display (LCD) television adapters, battery chargers, consumer appliances such as Digital Video Discs (DVD) and video cassette recorders, wireless access points, Internet Protocol (IP) phones, etc. Most of the high efficiency switching mode power supplies in use today use Synchronous Rectification (SR) to achieve the desired efficiency for an SMPS power stage. Switching mode power supplies typically include an SR controller for controlling a Synchronous Rectification Metal Oxide Semiconductor Field Effect Transistor (SR MOSFET) switch that bypasses a standard rectifier. FIG. 1 is a circuit schematic of a portion of a secondary side 12 of an SR system in an SMPS 10. For the sake of clarity the connections on primary side 14 of SMPS 10 have been omitted. What is shown in FIG. 1 is a secondary side synchronous rectification controller 16, an SR MOSFET 18, a Schottky diode 20, a secondary winding 22, a filtering capacitor 25, and a load 27 mounted to a printed circuit board 28. By way of example, load 27 comprises a resistor. Controller 16 may be, for example, a synchronous rectification controller having part number NCP4302 and manufactured by Semiconductor Components Industries, LLC and serves to set a threshold voltage for turning off SR MOSFET 18. Controller 16 has an output 30 connected to a gate terminal of SR MOSFET 18, a current sensing input 32 connected to the drain terminal of SR MOSFET 18, and an input 34 connected to ground which serves as a current return pin. Controller 16 includes a comparator 36 having an output connected to an internal logic circuit 41, which has an output coupled for driving the gate of SR MOSFET 18. Examples of internal logic circuit 41 are known to those skilled in the art. For example, the data sheet for part number NCP4302 manufactured by Semiconductor Components Industries, LLC illustrates suitable circuitry for logic circuit 41. Comparator 36 also has an input connected to input 32 and an input coupled to a voltage source 38 that provides a threshold reference voltage $V_{THR}$. SR MOSFET 18 has a body diode 44 between its source and drain and parasitic drain and source inductances represented by parasitic drain inductor 40 and a parasitic source inductor 42. Parasitic inductors 40 and 42 are the result of electrically conductive elements such as leads and bond wires that are within the packaging material of SR MOSFET 18. Schottky diode 20 is connected across the drain and source terminals of SR MOSFET 18.

In operation, controller 16 determines the drain-to-source voltage of SR MOSFET 18 and uses this voltage in combination with the threshold reference voltage $V_{THR}$ to set the turn-off current level of the current flowing through SR MOSFET 18. Typically, threshold reference voltage $V_{THR}$ is selected to be near zero so that the turn-off current is small or substantially equal to zero. A secondary current ($I_{SEC}$) flows from filtering capacitor 25 and load 27 through SR MOSFET 18 towards secondary winding 22, creating a voltage drop across parasitic drain and source inductors 40 and 42, respectively, that increases the turn-off current. The increased turn-off current is caused by an inaccurate determination of the voltage drop across the channel of the SR MOSFET, i.e., by an inaccurate determination of the value of the channel voltage resulting from the product of secondary current $I_{SEC}$ and resistance $R_{ds\_ON}$. The inaccuracy results from the voltages developed across parasitic elements associated with printed circuit board 28 and the voltage developed across parasitic inductors 40 and 42 associated with SR MOSFET 18. When SMPS 10 operates in a discontinuous conduction mode (DCM) or, alternatively, when SMPS 10 operates as a series resonant converter such as, for example, an inductor-inductor capacitor (LLC) series resonant converter at a frequency that is below its series resonant frequency, it is desirable to detect when secondary current $I_{SEC}$ reaches a zero value.

A commonly used technique to compensate for parasitic voltage drops across the parasitic passive circuit elements associated with printed circuit board 28 involves measuring the drain-to-source voltage using a Kelvin sensing probe. However, this technique does not account for voltage drops across parasitic inductors 40 and 42 associated with SR MOSFET 18. Thus, the determination of the channel voltage (which equals $I_{SEC}*R_{ds\_ON}$) is inaccurate because it is derived from a voltage measurement that includes the voltages across parasitic inductors 40 and 42.

A drawback with the circuit shown in FIG. 1 is that secondary current $I_{SEC}$ is still flowing when the drain-to-source voltage is zero. Thus, SR MOSFET 18 still carries a significant secondary current $I_{SEC}$. Because SR MOSFET 18 is turned off, channel conduction and the efficiency the SR system within SMPS 10 are decreased. The effect of parasitic inductors 40 and 42 becomes more serious in high frequency applications where the change of current with respect to time increases and the SR MOSFET $R_{ds\_ON}$ value decreases.

In addition, parasitic inductors 40 and 42 create a phase shift between the drain current and the drain-to-source voltage which results in an increased turn-off current for SR MOSFET 18 that changes with load current. When threshold reference voltage $V_{THR}$ has a negative voltage, the turn-off current of SR MOSFET 18 is even higher.

Accordingly, it would be advantageous to have a method and structure for compensating for parasitic components within a transistor. It would be of further advantage for the method and structure to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

DETAILED DESCRIPTION

Figure 1:
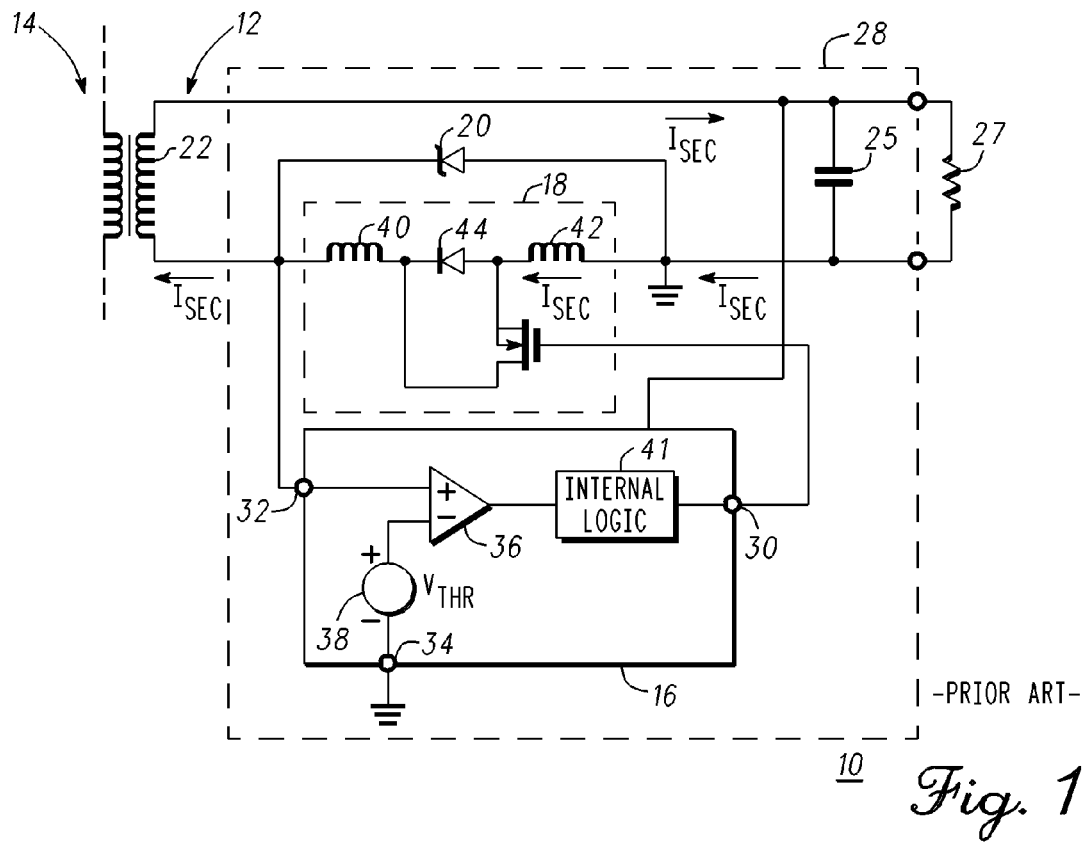
FIG. 1 is a schematic diagram of a portion of a prior art switching mode power supply.
Figure 2:
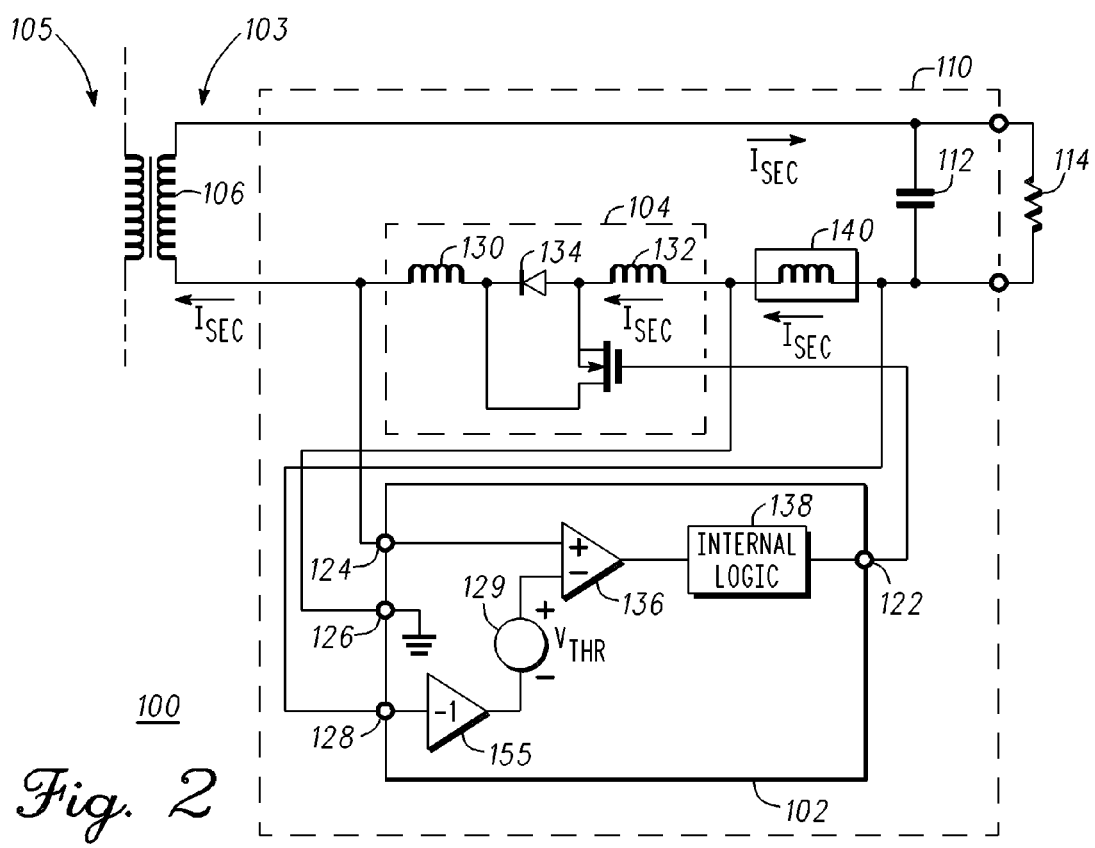
FIG. 2 is a schematic diagram of a portion of a switching mode power supply in accordance with an embodiment of the present invention.

FIG. 2 is a schematic diagram of a portion of a secondary side 103 of a switching mode power supply 100 in accordance with an embodiment of the present invention. The portion of switching mode power supply 100 shown in FIG. 2 includes a secondary side synchronous rectification controller 102, an SR MOSFET 104, a secondary winding 106, a filtering capacitor 112, and a load 114 mounted to a printed circuit board 110. For the sake of clarity the connections on primary side 105 of SMPS 100 have been omitted. By way of example, load 114 comprises a resistor. SR MOSFET 104 has a parasitic drain inductor 130, a parasitic source inductor 132, and a body diode 134 between its source and drain. Parasitic inductors 130 and 132 result from electrically conductive elements such as leads and bond wires that are within the packaging material of SR MOSFET 104. Parasitic drain inductor 130 is also referred to as a drain terminal parasitic inductor and parasitic inductor 132 is also referred to as a source terminal parasitic inductor. The gate terminal, drain terminal, and source terminal of SR MOSFET 104 are connected to driver output 122, current sensing input 124, and current return input 126 of controller 102, respectively. Controller 102 includes a reference voltage compensation input 128 coupled for receiving a control signal for controlling a voltage source 129 that outputs a threshold reference voltage $V_{THR}$. Voltage source 129 is coupled to input 128 through an analog inverter 155. Controller 102 further includes a comparator 136 and an internal logic circuit 138, where comparator 136 has an input coupled for receiving threshold reference voltage $V_{THR}$, an input connected to current sensing input 124, and an output connected to an input of internal logic circuit 138. Internal logic circuit 138 has an output connected to output 122 for providing a gate drive signal to the gate terminal of SR MOSFET 104. Examples of internal logic circuit 138 are known to those skilled in the art. For example, the data sheet for part number NCP4302 manufactured by Semiconductor Components Industries, LLC illustrates suitable circuitry for logic circuit 138.

In addition, switching mode power supply 100 includes a compensation element such as, for example, a compensation inductor 140 connected between parasitic source inductor 132 and compensation input 128. Preferably, the inductance value of compensation inductor 140 is selected to match the sum of the inductance values of parasitic inductors 130 and 132. The voltage drop across compensation inductor 140 is used to change the turn-off threshold of SR MOSFET 104. Preferably, current $I_{SEC}$ flows through parasitic inductors 130 and 132 and compensation inductor 140.

In operation, controller 102 determines the channel voltage of SR MOSFET 104 and uses this voltage in combination with threshold reference voltage $V_{THR}$ to set the turn-off current level of the current flowing through SR MOSFET 104. Typically, threshold reference voltage $V_{THR}$ is selected to be near zero so that the turn-off current is small or substantially equal to zero. When SMPS 100 operates in a discontinuous conduction mode (DCM) or, alternatively, when SMPS 100 operates as a series resonant converter such as, for example, an inductor-inductor-capacitor (LLC) converter at a frequency that is below its series resonant frequency, a secondary current ($I_{SEC}$) substantially flows in a direction from filtering capacitor 112 through compensation inductor 140 towards secondary winding 106. It should be noted that a small portion of secondary current $I_{SEC}$ flows into input 126; however, this portion is negligible compared to the portion of current $I_{SEC}$ that flows towards secondary winding 126. Current $I_{SEC}$ creates a voltage $V_{COMP}$ across compensation inductor 140. Secondary current $I_{SEC}$ flowing through SR MOSFET 104 towards secondary winding 106 generates voltages $V_{LD}$ and $V_{LS}$ across inductors 130 and 132, respectively.

Figure 3:
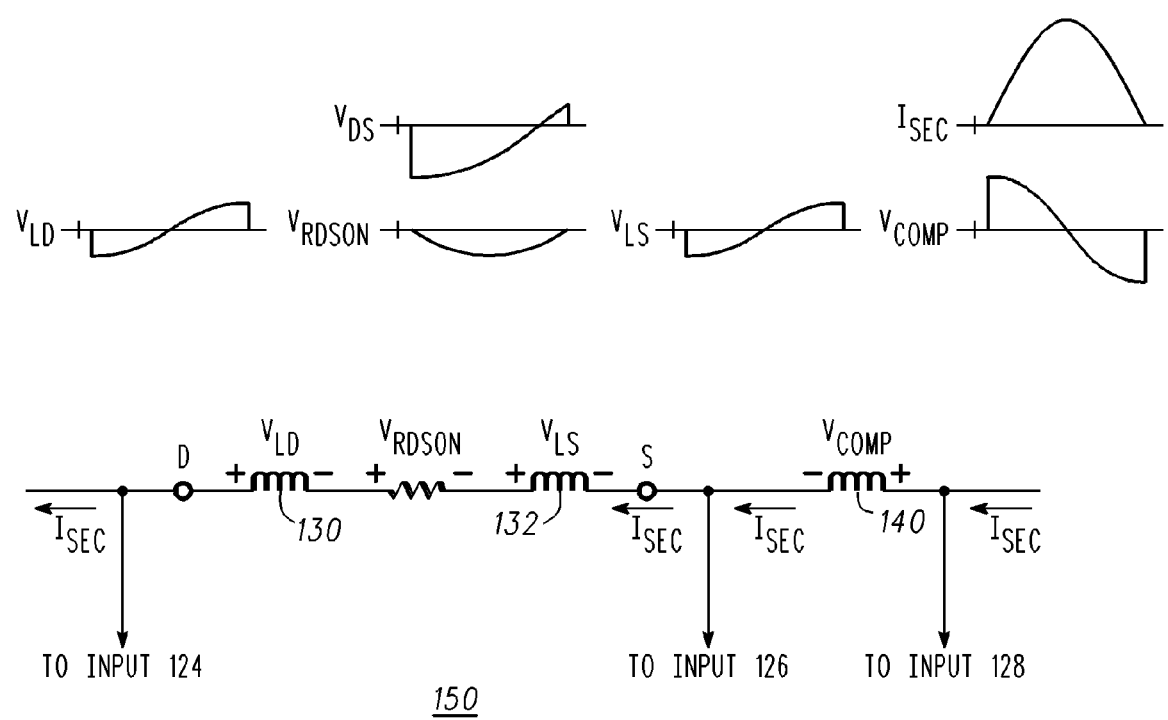
FIG. 3 is an equivalent circuit of a portion of the switching mode power supply of FIG. 2.

Referring now to FIG. 3, an equivalent circuit 150 of SR MOSFET 104 and compensation inductor 140 is illustrated.

As discussed above, the inductance value of compensation inductor 140 preferably is the sum of the inductance values of parasitic inductors 130 and 132. Current $I_{SEC}$ flows through SR MOSFET 104 creating a voltage $V_{LD}$ across drain parasitic inductor 130, a voltage $V_{LS}$ across source parasitic inductor 132, and a channel voltage $V_{Rds\_ON}$ across resistance $R_{ds\_ON}$. In addition, secondary current $I_{SEC}$ flows through compensation inductor 140 creating compensation voltage $V_{COMP}$, which compensation voltage is transmitted to compensation voltage input 128 where it is inverted by internal inverter 155 and shifts the voltage level of threshold voltage reference $V_{THR}$ by an amount substantially equal to the voltage introduced by parasitic inductors 130 and 132. Because the inductance value of compensation inductor 140 substantially equals the sum of the inductance values of parasitic inductors 130 and 132 and secondary current $I_{SEC}$ flows through compensation inductor 140 and parasitic inductors 130 and 132, the sum of the absolute values the voltages across inductors 130 and 132 is substantially equal to the absolute value of the compensation voltage across inductor 140. Thus, the voltage across compensation inductor 140 compensates for the voltages across parasitic inductors 130 and 132, leaving internal comparator 136 detect the channel voltage $V_{Rds\_ON}$. Channel voltage $V_{Rds\_ON}$ provides an accurate indication of the instantaneous current flowing through on-resistance $R_{ds\_ON}$ of SR MOSFET 104. An advantage of using compensation inductor 140 to change reference voltage $V_{THR}$ is that it makes switching mode power supplies like SMPS 100 invariant to changes in load current and operating frequency of the converter.

FIG. 3 also shows plots of voltage signals versus time for the voltages across inductors 130, 132, and 140, and on resistance $R_{ds\_ON}$, and the drain-to-source voltage $V_{DS}$. In addition a plot of current signal $I_{SEC}$ versus time is shown in FIG. 3.

By now it should be appreciated that a method and a circuit for compensating for parasitic inductances in a switching field effect transistor have been provided. In accordance with an embodiment, a compensation inductance is added to a substrate on which a switching MOSFET is mounted so that a current flowing through the compensation inductor creates a compensation signal such as for example, a compensation voltage, that appears at an input of a controller. The compensation voltage changes the output level of threshold reference voltage, $V_{THR}$, within the controller, wherein the changed reference voltage appears at an input of a comparator within the controller. A drain-to-source voltage that includes voltages developed across parasitic drain and source inductors and across on resistance $R_{ds\_ON}$ appears at the other input of the comparator. The compensation voltage compensates for the voltage across the drain and source parasitic inductances thereby allowing an accurate sensing of the channel voltage, i.e., the voltage across resistance $R_{ds\_ON}$. Accurately sensing the voltage across the channel of the MOSFET enables accurately adjusting its turn-off current threshold to be near zero, which in turn allows increasing the conduction time of the MOSFET and increasing the efficiency of the SR system. Because compensation inductor 140 compensates for the parasitic source and drain inductors of SR MOSFET 104, the turn-off threshold of the comparator is substantially invariant to the amplitude and derivative of the secondary current $I_{SEC}$, as well as to the operating frequency of SMPS 100.

Alternatively, the compensation component can be made from the substrate. For example, when the substrate is a printed circuit board, an electrically conductive trace can be formed on or in the printed circuit board, wherein the electrically conductive trace is a compensation inductor similar to compensation inductor 140.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method of compensating for one or more parasitic elements of a transistor, comprising:
   providing the transistor having a control electrode and first and second current carrying electrodes, wherein the transistor includes the one or more parasitic elements and wherein the one or more parasitic elements comprises a source parasitic inductance and a drain parasitic inductance;
   providing a non-parasitic compensation inductor having first and second terminals, the first terminal commonly coupled to the first current carrying electrode of the transistor and for receiving a source of operating potential;
   selecting a value of the non-parasitic compensation inductor to match a sum of the inductance values of the source parasitic inductance and the drain parasitic inductance;
   generating a compensation signal from the non-parasitic compensation inductor; and
   using the compensation signal to compensate for a voltage across at least one parasitic inductance of the transistor wherein using the compensation signal includes transmitting a voltage substantially equal to a voltage across an on resistance of the transistor.

2. The method of claim 1, wherein generating the compensation signal includes developing a voltage across a compensation inductor.

3. The method of claim 1, further including using the compensation signal to change a threshold reference voltage.

4. The method of claim 3, further including transmitting a current through a first inductor to generate the compensation signal.

5. The method of claim 1, wherein using the compensation signal to compensate for the signal of at least one parasitic inductance of the transistor includes transmitting a voltage substantially equal to a voltage across an on resistance of the transistor.

6. A method for adjusting a reference voltage, comprising:
   generating a voltage across first and second terminals of a transistor, wherein the transistor includes a parasitic source inductance and a parasitic drain inductance and wherein a portion of the voltage is across the parasitic source inductance and the parasitic drain inductance;
   selecting a value of the non-parasitic compensation inductor to match a sum of the inductance values of the source parasitic inductance and the drain parasitic inductance;
   generating a compensation signal from the non-parasitic compensation inductor; and
   wherein using the compensation voltage to compensate the voltage of the parasitic source inductance and the parasitic drain inductance of the transistor includes using a voltage substantially equal to a voltage across an on resistance of the transistor as a portion of the compensation voltage wherein the passive non-parasitic compensation inductor has a terminal commonly coupled to the transistor and for receiving a source of operating potential.

7. The method of claim 6, further including using the compensation signal to change a threshold reference voltage.

8. The method of claim 7, further including transmitting a current through a first inductor to generate the compensation signal.

9. The method of claim 6, wherein generating the voltage across the first and second terminals of the transistor includes generating a voltage across a drain terminal parasitic inductor and a source terminal parasitic inductor.

10. The method of claim 9, wherein the compensation voltage compensates for a portion of the voltage across the drain terminal parasitic inductor and the source terminal parasitic inductor.

11. The method of claim 9, further including using the compensation voltage to adjust an output level of a threshold reference voltage.

12. The method of claim 11, wherein generating the compensation voltage includes generating the compensation voltage across the compensation inductor.

13. The method of claim 6, wherein generating the compensation voltage from the passive non-parasitic compensation inductor includes generating the compensation voltage across the compensation inductor that is mounted to a substrate.

14. The method of claim 13, wherein generating the compensation voltage from the passive non-parasitic compensation inductor that is mounted to the substrate includes providing a printed circuit board that serves as the substrate.

15. The method of claim 14, further including using the compensation voltage to adjust an output level of a reference voltage.

16. The method of claim 13, further including generating the compensation voltage from the passive non-parasitic compensation inductor that is formed from conductive traces formed on or in the substrate.

17. A circuit, comprising: a substrate having a major surface; a transistor mounted to the substrate, the transistor having a plurality of terminals and at least a source parasitic inductance and a drain parasitic inductance; and a compensation inductor having first and second terminals mounted to the substrate, wherein the compensation inductor is a passive non-parasitic circuit element and selected to compensate for at least one parasitic element of the transistor, the first terminal of the compensation inductor commonly coupled to a first terminal of the transistor and for receiving a source of operating potential, wherein a value of the non-parasitic compensation inductor is selected to match a sum of the inductance values of the source parasitic inductance and the drain parasitic inductance and wherein the compensation inductor is configured to generate a compensation signal to compensate for a voltage across the at least one parasitic inductance of the transistor wherein the compensation signal includes a voltage substantially equal to a voltage across an on resistance of the transistor.

18. The circuit of claim 17, further including a secondary side synchronous rectification controller having first, second, and third inputs and an output, the second input coupled to the first terminal of the compensation inductor, wherein the secondary side synchronous rectification controller comprises:
   an analog inverter having an input and an output the input coupled to the second terminal of the compensation inductor through the first input of the secondary side synchronous rectification controller;
   a voltage source having first and second terminals, the first terminal coupled to the output of the analog inverter;

a comparator having first and second inputs, the first input coupled to the second terminal of the transistor through the third input; and an internal logic circuit having and input and an output, the input coupled to the output of the comparator and the output coupled to the third terminal of the transistor through the output of the secondary side synchronous rectification controller.

* * * * *